United States Patent [19]

Kolb et al.

[11] 4,264,997
[45] May 5, 1981

[54] WIPING ARRANGEMENT FOR WIPING A VEHICLE WINDOW

[75] Inventors: Erich Kolb, Bühl, Fed. Rep. of Germany; Heinrich Laurent, Strasbourg, France

[73] Assignee: Robert Bosch GmbH, Stuttgart, Fed. Rep. of Germany

[21] Appl. No.: 33,834

[22] Filed: Apr. 27, 1979

[30] Foreign Application Priority Data

May 9, 1978 [DE] Fed. Rep. of Germany ....... 2820104

[51] Int. Cl.³ ................................................. B60S 1/24
[52] U.S. Cl. ............................. 15/250.29; 15/250.34
[58] Field of Search ............ 15/250.29, 250.3, 250.31, 15/250.34, 250.16, 250.17

[56] References Cited

U.S. PATENT DOCUMENTS

| | | | |
|---|---|---|---|
| 2,259,790 | 10/1941 | Auten | 15/250.3 |
| 2,760,221 | 8/1956 | Hitzelburger | 15/250.3 |
| 3,012,266 | 12/1961 | Riester et al. | 15/250.3 X |

*Primary Examiner*—Christopher K. Moore
*Attorney, Agent, or Firm*—Michael J. Striker

[57] ABSTRACT

A wiping arrangement for wiping a vehicle window has a rotatable output shaft, a wiper shaft connected with a wiping element, and pendulum elements for converting the rotary movement of the output shaft into the pendulum movement of the wiper shaft. The pendulum elements include a crank member connected with and rotatable by the output shaft, a rocker arm connected with the wiper shaft, and a connecting rod which is pivotally connected with the crank member and the rocker arm. Elements are provided which allow swinging of the connecting rod even when the wiper shaft is blocked, for example as a result of snow accumulation in the region behind the wiper shaft. Thus, the connecting rod can swing about a hinge which connects the same to the rocker arm, and thereby the crank member can rotate despite the blocking of the wiper shaft.

9 Claims, 4 Drawing Figures

WIPING ARRANGEMENT FOR WIPING A VEHICLE WINDOW

BACKGROUND OF THE INVENTION

The present invention relates to a wiping arrangement for wiping a vehicle window.

Wiping arrangements for wiping vehicle windows are widely used. In known wiping arrangements in condition of snow-fall, snow is moved by a wiping element of the arrangement to marginal regions of an area of the vehicle window to be wiped and continuously reduces this area until the arrangement is blocked. This leads to premature deflection of the hinges of the pendulum drive of the arrangement, to deformation of rods of the pendulum drive and occasionally to breakage of an electric motor of the arrangement.

SUMMARY OF THE INVENTION

Accordingly, it is an object of the present invention to provide a wiping arrangement for wiping a vehicle window, which avoids the disadvantages of the prior art.

More particularly, it is an object of the invention to provide a wiping arrangement for wiping a vehicle window, in which when an area of the vehicle window is reduced and a wiping element of the arrangement is blocked, other parts of the arrangement which are located upstream of the wiping element can unimpededly continue their movements.

In keeping with these objects and with others which will become apparent hereinafter, one feature of the present invention resides, briefly stated, in a wiping arrangement which has a rotatable output shaft, a wiper shaft carrying a wiping element, and a swinging drive including a crank member connected with the output shaft for joint rotation therewith, a rocker arm connected with the wiper shaft, and a swingable connecting rod pivotally connected with the crank member and the rocker arm, wherein means is provided for allowing swinging of the connecting rod even in the case when the wiper shaft is blocked, so that the connecting rod can swing and thereby the crank member can rotate despite the blocking.

When the wiping arrangement is constructed in accordance with the present invention, the elements of the arrangement located upstream of the wiper shaft can continue their movements despite blocking of the wiper shaft. Thereby, no deflection of the hinges of the arrangement and deformation of the rods thereof take place, and danger of breakage of the electric motor of the arrangement is eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
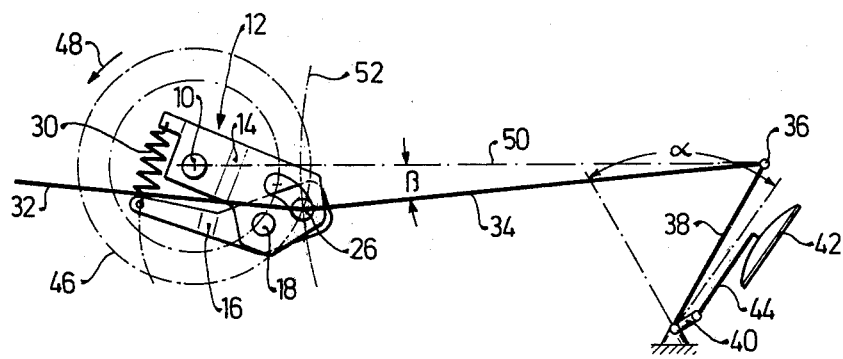
FIG. 1 is a schematic view of an arrangement for wiping a vehicle window in accordance with one embodiment of the present invention.
Figure 2:
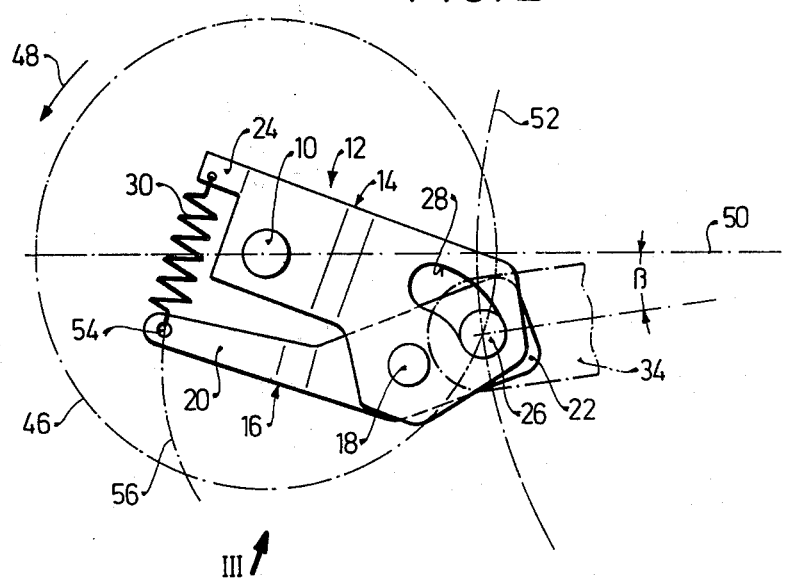
FIG. 2 is an enlarged view of a crank member composed of two parts, of the arrangement shown in FIG. 1.
Figure 3:
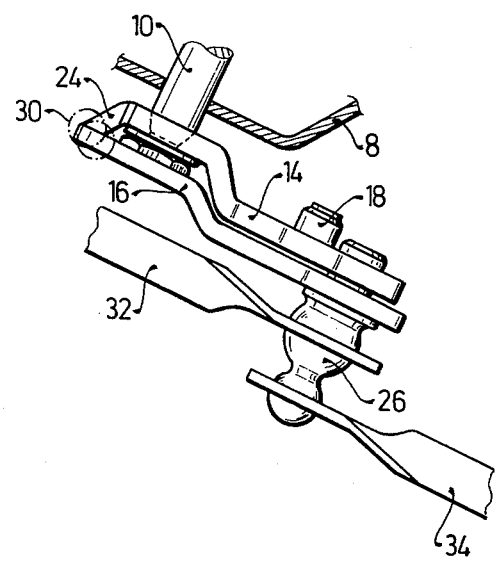
FIG. 3 is a view showing the crank member of FIG. 2 in a direction of arrow III.

A wiping arrangement is shown in FIG. 1 and has an output shaft 10 which is driven in rotation by a drive unit 8 (FIG. 3). The output shaft 10 is firmly connected with a crank 12. The crank 12 is composed of two parts and has a lever 14 which is joined with the shaft 10. A two-arm lever 16 is articulately connected with the lever 14 by a hinge 18 and has two arms 20 and 22 located at opposite sides of the hinge 18. The lever 14 has a projection 24 extending from the lever at its side which is opposite to the side whereat the shaft 10 is located. One arm 20 of the lever 16 extends substantially parallel to the projection 24. The other arm 22 of the lever 16 is offset relative to the arm 20, as can be seen from FIG. 2. The arm 22 essentially overlaps the lever 14. The lever 14 and the two-arm lever 16 are located in planes which are parallel to each other.

A spherical joint 26 is provided adjacent to the free end of the arm 22 of the lever 16. The spherical joint 26 extends parallel to the hinge 18 and pierces the lever 14. More particularly, it extends through an elongated opening 28 formed in the lever 14. The elongated opening 28 has a curved contour, and the hinge 18 forms a center from which the elongated opening 28 is described. The two-arm lever 16 can pivot relative to the lever 14 about the hinge 18, and the spherical joint 26 moves in the curved opening 28. The pivotal movement of the two-arm lever 16 is limited by the ends of the elongated opening 28. The elongated opening 28 is so arranged that, in addition to its curvature, it extends at least approximately radially, as can be seen from FIG. 2.

A tension spring 30 is further provided. One end of the tension spring 30 is connected with the projection 24 of the lever 14, whereas the other end of the spring 30 is firmly connected with the end portion of the arm 20 of the lever 16. The spring 30 is prestressed so that the arm 20 of the lever 16 is urged to the projection 24 of the lever 14 or to the shaft 10. This pivotal movement is, however, limited when the spherical joint 26 abuts against the end of the elongated opening 28, which is remote from the shaft 10. The spherical joint 26 is composed of two spherical parts which are known per se in the art and are not shown in the drawing for the sake of simplicity. As can be seen from FIG. 3, connecting rods 32 and 34 extend in two opposite directions and are connecting with respective spherical parts of the spherical joint 26.

The free end of the connecting rod 34 is articulately connected by a second hinge 36 with a rocker arm 38, as shown in FIG. 1. The end of the rocker arm 38, which is spaced from the hinge 36 is connected with a wiper shaft 40. A wiper arm 44 with a wiping element 42 is mounted on the wiper shaft 40. In operation of the wiping arrangement, the output shaft 10 of the drive means 8 and thereby the crank 12 perform a rotary movement, as can be seen in FIG. 1. Thereby, the spherical joint 26 moves along an orbit 46 in a direction which is identified by an arrow 48. This rotation is transmitted through the connecting rod 34, the second hinge 36 and the rocker arm 38 as a swinging movement to the rocker arm 40. The rocker arm 38, the wiper shaft 40, and the wiping element 42 together with the wiper arm 44 perform pendulum movement through an angle α. The arrangement is so constructed that the longitudinal axes of the output shaft 10, the hinge 18 and the spherical joint 26 are located parallel to each other. Further, the hinge 18 is located inside the orbit 46 of the spherical joint 26 which makes possible the pivotal connection between the crank 12 and the connecting rod 34. The hinge 18 is located rearwardly of the spherical joint 26, as considered in the direction of rotation 48 of the crank 12.

When the wiping arrangement is blocked in the rear region of the wiping element 42, for example as a result of snow accumulation, the drive unit 8 rotates the crank 12 in the above-mentioned direction of the arrow 48. In this position the connecting rod 34 encloses an acute angle β with a so-called dead position 50 of the connecting rod 34, as shown in FIG. 2. Since the wiping element 42 and, therefore, the wiper shaft 40 and the rocker arm 38 are blocked, the connecting rod 34 can pivot only about the second hinge 36, as can be seen in FIG. 1. Thereby, the connection between the connecting rod 34 and the crank 12 formed by the spherical joint 26 moves along a track 52 which extends into the orbit 46 of the spherical joint 26 and is spaced from the output shaft 10 by a distance corresponding to the radius of the orbit 46.

The above-mentioned auxiliary movement, which however, does not involve a movement of the wiper arm 44 with the wiping element 42, is possible due to the provision of the elongated opening 28 which extends from the orbit 46 in a direction of the output shaft 10. Therefore, the spherical joint 26 runs further along its track 52, and simultaneously rotates in the elongated opening 28 through a predetermined angle about the hinge 18, until the track 52 of the spherical joint 26 extends outwardly beyond the orbit 46. Thereby the arm 20 of the lever 16 pivots similarly about the hinge 18, and the point of connection between the tension spring 54 and the arm 20 moves along a track 56 so that the tension spring 30 is further tensed. In the region wherein the track 52 is located inside the orbit 46, the two-arm lever 16 is so pivoted that the spherical joint 26 moves against the tension of the spring 30 toward the output shaft 10.

The crank 12 is provided with the swingable spherical joint 26 by which a variable decrease of the distance between the pivot and the output shaft is attained. The center of rotation of the spherical joint is so located that the pivots in the region of the wiping arrangement are continuously pressed to a stop so that under some conditions the spring 30 can be dropped. The construction shown in FIGS. 1-3 can be easily sealed from dust and water. The friction in the arrangement is small.

Figure 4:
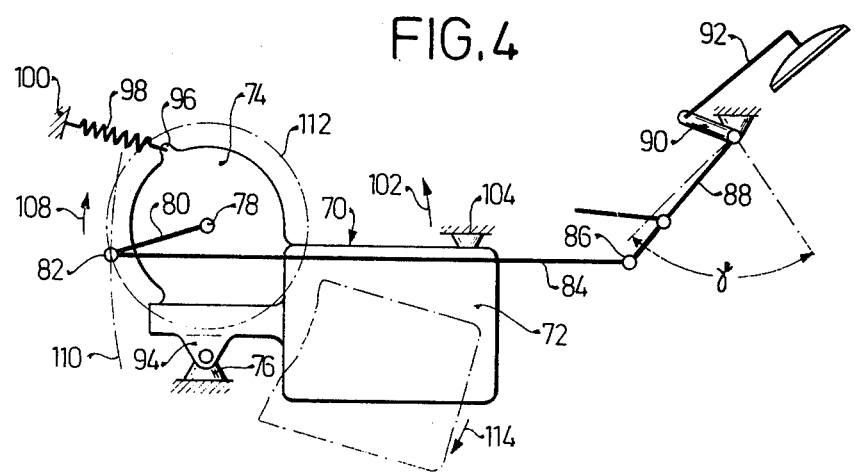
FIG. 4 is a schematic view showing an arrangement for wiping a vehicle window in accordance with a further embodiment of the present invention.

A wiping arrangement in accordance with another embodiment of the invention is shown in FIG. 4. It has a drive unit 70 composed of a drive motor 72 and a reduction transmission 74. The drive unit is articulately mounted on a support member 76. A crank 80 is mounted on an output shaft 78 of the drive unit 70. A connecting rod 84 is articulately connected with the crank 80 by a hinge 82. Another end of the connecting rod 84 is connected by a second hinge 86 with a rocker arm 88 whose opposite end is mounted on a wiper shaft 90. The wiper shaft 90 is connected with a wiping lever 92 which is composed of a wiping element and a wiper arm.

A hinge member 94 is mounted on a housing part of the drive unit and forms a pivotal connection with the support member 76. The housing of the drive unit 70 has an ear 96 located at a distance from the hinge case 94, the ear being provided for suspending a tension spring 98. At the end which is spaced from the ear 96, the spring 98 is firmly connected with a support member 100. Since the tension spring 98 is prestressed, the drive unit 70 pivots in direction of arrow 102 about an axis defined by the hinge case 94. Then it abuts against a rigid stop 104 as can be seen from FIG. 4.

When during the operation of the arrangement, the crank 80 rotates in the direction of an arrow 108, the rocker arm 88 together with the wiper shaft 90 and the wiping arm 92 pivot through an angle α. When the wiping arrangement is blocked, for example as a result of snow accumulation in the reverse position of the wiping lever 92 behind the wiper shaft, as shown in FIG. 4, the connecting rod 84 can pivot about the second hinge 86. The hinge 82 by which the rocker arm is connected with the crank 80, moves along a track 110 which extends over a predetermined distance inside the orbit 112 of the hinge 82. This is possible because in this case the drive unit 70 pivots about the hinge which is formed by the hinge member 94 in the direction of an arrow 114. The hinge 82 moves along the track 110 until it reaches the orbit. The pivotal movement in the direction of the arrow 114 is performed against the pulling force of the tension spring 98. The force of the spring 98 must be so great that during normal operation of the drive unit, it abuts against the stop 104 and thereby overcomes the friction torque of the wiping element relative to the vehicle window.

For the sake of clarification it has to be mentioned what is understood under the term "behind the wiper shaft". This term defines the direction of flux of forces which leads, as a rule, from the drive unit to the wiping element. Thus, the wiper arm and the wiping element are located behind the wiper shaft, whereas the drive unit and the swinging drive of the arrangement are located forwardly of the wiper shaft.

Thus, it is believed to be clear that the arrangement in accordance with both above-described embodiments has means which in the case of blocking of the wiping arrangement behind the wiper shaft 40 or 90 makes possible pivoting of the connecting rods 34 or 84 about the hinges 36 or 86 which connect the rocker arms 38 or 88 with the connecting rods 34 and 38. Thereby, the rotation of the cranks 12 or 80 is possible. These means are in both cases formed by the hinge 18 or 94 which permits temporary or transitory travelling of parts 12, 26 or 70 located forwardly of the wiper shaft 40 or 90. In both cases the travelling of the parts is performed against the force of a spring 30 or 98.

It will be understood that each of the elements described above, or two or more together, may also find a useful application in other types of constructions differing from the types described above.

While the invention has been illustrated and described as embodied in a wiping arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiping arrangement for wiping a vehicle window, comprising a rotatable output shaft; wiping means including at least one wiper shaft arranged for performing a swinging movement, and a wiping element connected with said wiper shaft for joint swinging movement therewith; swinging drive means operative for converting the rotary movement of said output shaft into the swinging movement of said wiper shaft and including a crank member connected with said output shaft and including a first lever, a rocker arm arranged to swing about a pivot point and connected with said wiper shaft, and a swingable connecting rod having two end portions one of which is pivotally connected with said crank member, whereas the other end portion is pivotally connected with said rocker arm by a hinge; and means for allowing swinging of said connecting rod about said hinge even when the arrangement is blocked in the region behind said wiper shaft, so that said connecting rod can swing and thereby said crank member can rotate despite such blocking, said allowing means including at least one further hinge which allows temporary deflection of at least one element located upstream of said wiper shaft, a spring which is arranged so that said deflection is performed against force of said spring, and a second two-arm lever which is pivotally connected with said first lever of said crank member by said further hinge.

2. A wiping arrangement as defined in claim 1; and further comprising drive means operative for driving said output shaft in rotation.

3. A wiping arrangement as defined in claim 1, wherein said one end portion of said connecting rod is pivotally connected with said crank member by an additional hinge, said further hinge which connects said first lever with said second lever, and said additional hinge which connects said connecting rod with said crank member having axes which are parallel to one another.

4. A wiping arrangement as defined in claim 3, wherein said additional hinge which connects said connecting rod with said crank member moves along a predetermined orbit during operation of the arrangement, said further hinge which connects said first lever with said second lever being located inside said orbit.

5. A wiping arrangement as defined in claim 4, wherein said crank member is rotated by said output shaft in a first direction, said further hinge which connects said first lever with said second lever being located in said first direction rearwardly of said additional hinge which connects said crank member with said connecting rod.

6. A wiping arrangement as defined in claim 3, wherein said second two-arm lever has one arm and another arm, said additional hinge which connects said connecting rod with said crank member engaging said one arm of said second lever, whereas said spring engages the other arm of said second lever.

7. A wiping arrangement as defined in claim 6, wherein said spring is a tension spring and also engages said first lever of said crank member.

8. A wiping arrangement as defined in claim 6, wherein said second two-arm lever is swingable relative to said first lever of said crank member; and further comprising means for limiting the swinging movement of said second lever.

9. A wiping arrangement as defined in claim 8, wherein said first lever of said crank member has an elongated slot having two end sections, said additional hinge extending through and movable along said slot so that said end sections of said slot form said limiting means.

* * * * *